United States Patent [19]

Thomaides et al.

[11] Patent Number: 5,627,273

[45] Date of Patent: May 6, 1997

[54] METHOD FOR PREPARING HYDROPHOBICALLY-TERMINATED POLYSACCHARIDE POLYMERS AND DETERGENT COMPOSITIONS COMPRISING THE POLYSACCHARIDE POLYMERS

[75] Inventors: John S. Thomaides, Berkeley Heights; James Burkert, Rahway, both of N.J.

[73] Assignee: National Starch and Chemical Investment Holding Corporation, Wilmington, Del.

[21] Appl. No.: 381,624

[22] Filed: Jan. 31, 1995

[51] Int. Cl.$^6$ .............................. C07H 1/00; C07H 5/04; C07H 13/02; C08B 37/00

[52] U.S. Cl. .................. 536/18.7; 536/55.3; 536/118; 536/119; 536/120; 536/123.1

[58] Field of Search .................. 536/18.7, 118, 536/119, 120, 123.1, 55.3

[56] References Cited

U.S. PATENT DOCUMENTS

| | | | |
|---|---|---|---|
| 2,891,944 | 6/1959 | Boettner | 260/211 |
| 4,843,154 | 6/1989 | Klein et al. | 536/4.1 |
| 4,992,194 | 2/1991 | Liberati et al. | 252/99 |
| 5,066,749 | 11/1991 | Lieghton et al. | 526/271 |
| 5,126,069 | 6/1992 | Kud et al. | 252/174.23 |
| 5,147,576 | 9/1992 | Montague et al. | 252/174 |
| 5,194,639 | 3/1993 | Connor et al. | 554/66 |
| 5,494,602 | 5/1995 | Thomaides et al. | 252/174.17 |

FOREIGN PATENT DOCUMENTS

| | | |
|---|---|---|
| 0220676A1 | 5/1987 | European Pat. Off. . |
| 0383023A2 | 8/1990 | European Pat. Off. . |
| 0623670A2 | 11/1994 | European Pat. Off. . |
| WO91/09109 | 6/1991 | WIPO . |
| WO92/06984 | 4/1992 | WIPO . |
| WO92/08687 | 5/1992 | WIPO . |

OTHER PUBLICATIONS

Chemical Abstract, vol. 114, No. 12, issued Mar. 25, 1991, Begli et al, "Polymerizable Unsaturated Derivatives of Alkylureas Containing Saccharide Groups and Their Use in the Preparation of Surfactants", p. 140, column 2, abstract No. 104802b, Ger. Offen. DE 3,904,246).

Joachim Klein, Markwart Kunz, Jorg Kowalczyk, "New surfactant polymers based on carbohydrates", Makromol. Chem. 191, 517–528 (1990).

*Primary Examiner*—John Kight
*Assistant Examiner*—Everett White
*Attorney, Agent, or Firm*—William K. Wissing

[57] ABSTRACT

The present invention is directed to methods of preparing hydrophobically-terminated polysaccharide polymers. The methods utilized to prepare the hydrophobically-terminated polysaccharide polymers utilize water as the reaction solvent and do not utilize any cosolvent. The invention is also directed to hydrophobically-terminated polysaccharide polymers which are useful as deflocculants in liquid detergent compositions and to the liquid detergent compositions which contain the hydrophobically-terminated polysaccharide polymers.

16 Claims, No Drawings

METHOD FOR PREPARING HYDROPHOBICALLY-TERMINATED POLYSACCHARIDE POLYMERS AND DETERGENT COMPOSITIONS COMPRISING THE POLYSACCHARIDE POLYMERS

FIELD OF THE INVENTION

Hydrophobically-terminated polysaccharide polymers are prepared in processes which utilize water as the reaction solvent and which do not utilize a cosolvent in preparing the polysaccharide polymers. The hydrophobically-terminated polysaccharide polymers are useful as deflocculants in liquid detergent compositions.

BACKGROUND OF THE INVENTION

Methods for preparing substituted sorbitylureas are discussed in U.S. Pat. No. 2,891,944, issued to F. Boettner. The invention is directed to the reaction between the cyclic urethane of N-methyl-N-sorbitylcarbamic acid and a compound having the formula $RNH_2$, wherein R may represent a hydrogen atom or a hydrocarbon group. The cyclic urethane of N-methyl-N-sorbitylcarbamic acid is prepared by reacting N-methylglucamine and urea. It is said that the reaction may y be carried out with or without a solvent.

In *"New Surfactant Polymers Based on Carbohydrates"*, J. Klein, Makromol. Chem. 191, 517–528 (1990), amphiphilic poly(vinylsaccharide)s are disclosed. Various alkyl-amino substituted mono- and disaccharides were obtained by reductive amination of reducing mono- and disaccharides with $C_4$–$C_{10}$ alkyl amines. The linkage of a hydrophobic part with the mono- or disaccharide is said to have succeeded in a one-step reductive amination, wherein the mono- or disaccharide is reacted with a $C_4$–$C_{10}$ alkyl amine in the presence of hydrogen and a Raney nickel catalyst to form the alkyl-amino substituted mono- or disaccharide. The reaction was carried out in water or water/methanol solution. Subsequent coupling of the alkylamino substituted mono- or disaccharides with a vinyl substituted isocyanate was carried out at low temperature in aqueous systems or in organic solvents.

PCT/US91/06978, Scheibel et al., discloses processes for preparing N-alkyl polyhydroxy amines and fatty acid amides therefrom in hydroxy solvents. Amines such as methyl amines are reacted with materials such as reducing sugars in hydroxy solvents such as methanol to prepare N-alkyl polyhydroxy amines. An adduct of a reducing sugar and an amine is formed in an organic hydroxy solvent. The adduct is reacted with hydrogen in the presence of a Raney nickel catalyst to form the N-alkyl polyhydroxy amine. The catalyst and substantially all water are removed from the reaction mixture. The substantially anhydrous polyhydroxy amine product is then reacted with a fatty acid ester in an organic hydroxy solvent in the presence of a base catalyst to form the polyhydroxy fatty acid amide. The N-alkyl polyhydroxy amides thus formed are said to be useful as detersire surfactants.

PCT/US91/06979 discloses processes for preparing N-alkyl polyhydroxy amines in amine and amine/water solvents and fatty acid amides therefrom. A glucose/methyl amine adduct is prepared using excess methyl amine as the solvent. Optionally, the amine solvent may be replaced with an alcohol, such as methanol. The adduct is reacted with hydrogen in the presence of a Raney nickel catalyst to form the N-alkyl polyhydroxy amine. The catalyst, substantially all of the excess amine and water are removed from the reaction mixture. The substantially anhydrous polyhydroxy amine product is then reacted with a fatty acid ester in an organic hydroxy solvent in the presence of a base catalyst to form the polyhydroxy fatty acid amide. The N-alkyl polyhydroxy amides thus formed are said to be useful as detersive surfactants.

U.S. Pat. No. 5,194,639, issued to Connor et al., discloses methods of preparing polyhydroxy fatty acid amides which comprise reacting a fatty acid ester and an N-alkyl polyhydroxy amine in one or more hydroxy solvents in the presence of a base catalyst. Preferred hydroxy solvents are said to be $C_1$–$C_4$ alcohols, especially methanol. The N-alkyl polyhydroxy amides thus formed are said to be useful as detersive surfactants.

European patent application 0 220 676 A, in the name of Kunz, M., discloses surface-active agents comprising fatty acid amides of aminopolyols. The monoamides are prepared by reductive amination of mono- and oligosaccharides, followed by amidation of the aminopolyols so produced. The amidation process involves the use of solvents such as absolute methanol, butyl alcohol, ethyl acetate, chloroform or toluene.

Liquid detergent compositions, particularly concentrated liquid detergent compositions for laundry use, must be formulated for shelf-stability during manufacturing, distribution and consumption by the ultimate consumer.

Liquid detergent compositions are formulated with detersive surfactants and other cleaning aids and detergency builders (typically comprising dissolved electrolyte) and, optionally, solid particles, which are dispersed in a continuous aqueous phase. The detersive surfactant used in the liquid detergent compositions may exist in the form of lamellar droplets contained in a lamellar dispersion having a desirable turbid appearance and a sufficiently low viscosity to flow when poured by a consumer. Appropriate lamellar dispersions are described in U.S. Pat. No. 5, 147,576, Montague et al., issued Sep. 15, 1992, which is hereby incorporated by reference, and in PCT application number PCT/EP90/01962, Hales et al.

The addition of materials such as the traditional polyacrylates or acrylate/maleate copolymers as builders or co-builders has been observed to disturb the desirable rheology of the lamellar dispersion required in liquid detergent compositions. The incompatibility of traditional polyacrylates and acrylate/maleate copolymers in liquid detergent formulations has been a particular problem in concentrated liquid detergent formulations. "Concentrated liquid detergent" formulations contain a higher percent detersive surfactant than traditional liquid detergent compositions, i.e., at least about 25% detersive surfactant.

U.S. Pat. No. 5, 147,576, discloses a deflocculating polymer consisting of a hydrophilic backbone with hydrophobic side chains, which deflocculating polymer permits the formulation of concentrated liquid detergent compositions in the form of stable lamellar dispersions in a continuous aqueous phase. The deflocculating polymer permits incorporation of greater amounts of electrolytes than would otherwise be compatible with a liquid detergent composition having shelf-stability and the relatively low viscosity required by consumers. The deflocculating polymer provides stability in these liquid detergent compositions, whereas polymers traditionally used as stabilizers for emulsions do not perform as required in liquid detergent compositions.

PCT/EP90/01962 discloses liquid detergent compositions, in particular liquid detergent compositions which comprise a dispersion of lamellar droplets in an aqueous phase. One class of deflocculating polymers disclosed therein are biodegradable, hydrophobically-modified polysaccharides. Especially preferred are hydrophobically modified dextrans, more preferably dextrans having a molecular weight of 2,000 to 20,000. The hydrophobic groups may be connected to the hydrophilic backbone directly or via relatively hydrophilic linkages, for example a poly ethoxy linkage. In the polymers produced therein, the hydrophobic group may pend from other than a terminal position on the hydrophilic backbone. Additionally, in the polymers prepared therein, each chain may contain one hydrophobic group, more than one hydrophobic groups, or no hydrophobic group.

European patent application 623 670 A2 discloses the use of a biodegradable stabilizer comprising a hydrophilic polymeric chain of more than four hydrophilic monomer groups and/or having a mass greater than 300 amu. linked at one end to a hydrocarbon-soluble group to reduce or prevent the flocculation of systems comprising a flocculable surfactant and a liquid medium which is capable of flocculating said surfactant and in which said stabilizer is capable of existing as a micellar solution at a concentration of at least 1% by weight. One class of stabilizers disclosed therein are alkyl polyglycosides which are the products obtained by alkylating reducing sugars such as fructose or, preferably, glucose. The degree of polymerization of the alkyl polyglycosides is preferred to be greater than about 1.2, preferably from 2 to 20.

Neither EP 623 670 A2 nor PCT/EP90/01962 discuss economically viable processes for preparing the alkyl polyglycoside stabilizers or the hydrophobically-modified polysaccharide deflocculating polymers, respectively. It would be desirable, then, to develop processes for preparing biodegradable deflocculating polymers which are both efficient and economically viable.

It has now be found that liquid detergent compositions may be provided in a stable form comprising a lamellar dispersion of the detersive surfactant in a continuous aqueous phase by the addition of a biodegradable polymer having a hydrophilic polysaccharide backbone and a hydrophobic terminal group. It has also been discovered that the deflocculating polymers may be prepared efficiently utilizing economically viable processes. Thus, these polymers and the methods of making the polymers provide a simple, economically viable route to achieving stable detergent compositions, particularly highly concentrated compositions.

SUMMARY OF THE INVENTION

The present invention is directed to methods of preparing hydrophobically-terminated polysaccharide polymers. The methods used to prepare the hydrophobically-terminated polysaccharide polymers utilize only water as the reaction solvent and are free of a cosolvent. In one embodiment, the process comprises mixing together, in water and in the absence of a cosolvent, a polysaccharide of structure (I) herein below, with an amine of the formula $R^3NH_2$, where $R^3$ may be $C_1$–$C_3$ alkyl, H or $NH_2$. The admixture of the polysaccharide and the amine are contacted with pressurized hydrogen, in the presence of a Group VIIIB metal catalyst and under conditions effective to produce an N-substituted amino polysaccharide of structure (II) herein below. The N-substituted amino polysaccharide is reacted with a reagent, which reagent is terminated with one of an amine-reactive functionality, under conditions effective to produce a polysaccharide polymer of structure (III) herein below. The invention is also directed to hydrophobically-terminated polysaccharide polymers made by the process of the present invention.

The invention is also directed to liquid detergent compositions which utilize the polysaccharide polymer of the present invention as a deflocculating polymer. The liquid detergent compositions according to the present invention comprise at least 25%, by weight, detersive surfactant, at least 1%, by weight, electrolyte(s) contained in an aqueous continuous phase, and about 0.01 to 5%, by weight, polysaccharide deflocculating polymer (PDP).

DETAILED DESCRIPTION OF THE INVENTION

The present invention is directed to a process for preparing hydrophobically-terminated polysaccharide polymers, the process comprising:

(a) mixing together, in water and in the absence of a cosolvent, (i) a polysaccharide of the structure (I);

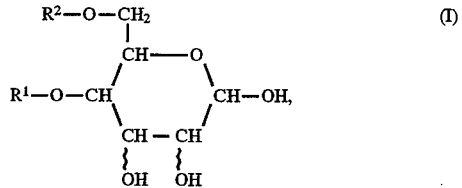

wherein, $R^1$ is H or is represented by structure I(a)

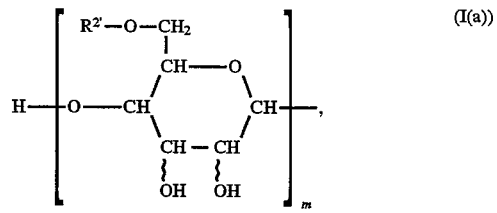

$R^2$ is H, or is represented by structure I(a) or structure I(b)

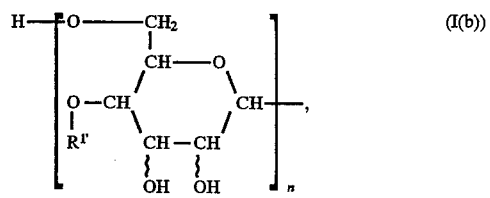

$R^{1'}$ is H or is represented by structure I(a),
$R^{2'}$ is represented by structure I(a) or structure I(b),
$R^1$ and $R^2$ are not both H, and the average of ($\Sigma m + \Sigma n$) is greater than or equal to 3, and (ii) an amine selected from the group consisting of $R^3NH_2$, where $R^3$ is selected from the group consisting of a $C_1$–$C_3$ alkyl group, H or $NH_2$, thereby producing an aqueous admixture of the polysaccharide and the amine, (b) contacting the aqueous admixture of the polysaccharide and the amine with hydrogen, under pressure, in the presence of a Group VIIIB metal catalyst and under conditions effective to produce an N-substituted amino polysaccharide of the structure (II);

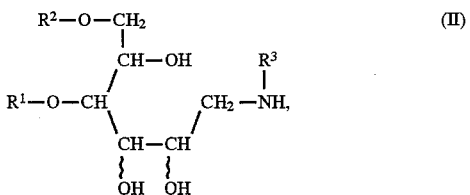

wherein $R^1$, $R^2$, $R^3$, $R^{1'}$ and $R^{2'}$ are as above and the average of $(\Sigma m + \Sigma n)$ is greater than or equal to 3, (c) adding to the N-substituted amino polysaccharide a reagent which is terminated with one of an amine-reactive functionality selected from the group consisting of a monocarboxylic acid chloride, isocyanate, chloroformate, mixed or symmetric anhydrides of carboxylic acids, epoxide, primary alkyl halide, primary alkyl sulfonate, primary alkyl sulfate, methylene beta-lactone (substituted ketene dimer) and succinic anhydride; and (d) mixing the N-substituted amino polysaccharide and the reagent under conditions effective to produce a polysaccharide polymer of the structure (III).

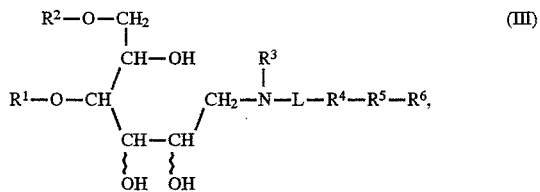

wherein $R^1$, $R^2$, $R^3$, $R^{1'}$ and $R^{2'}$ are as above, $R^4$ represents from 1 to 50 independently selected alkyleneoxy groups or is absent, $R^5$ is a phenylene linkage or is absent, $R^6$ is H, or a $C_1$–$C_{24}$ alkyl group, or the residue of a $C_8$–$C_{20}$ alkenyl succinic anhydride, provided that; when $R^5$ is absent and $R^6$ represents H or contains not more than 4 carbon atoms, then $R^4$ must contain an alkyleneoxy group with at least 3 carbon atoms; when $R^4$ is absent, then $R^6$ is not H; and when $R^4$ and $R^5$ are absent, then $R^6$ must contain at least 5 carbon atoms, L is the residue of the amine-reactive functionality, and the average of $(\Sigma m + \Sigma n)$ is greater than or equal to 3;

wherein the catalyst and excess amine are removed from the reaction.

The present invention excludes the use of a cosolvent with the water throughout the process for preparing the polysaccharide polymers. Cosolvent, as used herein, is intended to include organic solvents, such as alcohols, ketones, and polar aprotic solvents such as dimethyl sulfoxide, dimethyl formamide and pyridine. Cosolvent, as used herein, is also intended to include excess amine utilized in the process to the extent that the amine is present in amounts effective to function as a solvent in the process.

In forming the admixture of the polysaccharide of structure (I) and the amine, the polysaccharide and the amine are mixed together in water and in the absence of a cosolvent until an admixture thereof is formed. In preferred embodiments, the polysaccharide is added to water and blended until the polysaccharide is either dissolved in the water or homogeneously dispersed in the water. The polysaccharide/water mixture is added to the amine and blended, preferably at temperatures less than about 10° C., for a time effective to form an admixture of the polysaccharide and the amine, typically at least about one hour.

Generally, the polysaccharides used to prepare the polymers of the present invention are composed of glycosyl units connected by glycosidic linkages. These polysaccharides have one reducing end-group. They can be linear or branched, and they may be composed of a single type glycosyl unit or they may be composed of two or more different types of glycosyl units. Exemplary polysaccharides according to the present invention include, without limitation, starches, hydrolyzed starches, maltodextrins, corn syrup solids, cellulose, hydrolyzed cellulose, dextran, hydrolyzed dextran, guar gum, hydrolyzed guar gum, locust bean gum and hydrolyzed locust bean gum. Such starches include, for example, corn, potato, tapioca and rice starches. The polysaccharides used to prepare the polymers of the present invention are represented by structure (I), where $R^1$ and $R^2$ are as set forth herein above and where the average of $(\Sigma m + \Sigma n)$ is greater than or equal to 3. In particularly preferred embodiments, the polysaccharide is a starch represented by structure (I), where $R^1$ is represented by structure I(a) and $R^2$ is represented by structure I(a) or is H.

The amine used in the present invention is selected from the group consisting of $R^3NH_2$, where $R^3NH_2$, where $R^3$ may be a $C_1$–$C_3$ alkyl group, H or $NH_2$. Preferably, $R^3$ is a $C_1$–$C_3$ alkyl group. More preferably, the amine is methyl amine.

The admixture of the polysaccharide and the amine are contacted with hydrogen, under pressure and in the presence of a Group VIIIB metal catalyst, for a period of time effective to produce an N-substituted amino polysaccharide of structure (II) herein above. The particular substitution of the amino polysaccharide will depend on the amine used in preparing the N-substituted amino polysaccharide. For example, where $R^3$ is an alkyl group, an N-alkyl amino polysaccharide is formed.

Preferably, the admixture of the polysaccharide and the amine is placed in a reactor with the Group VIIIB metal catalyst and the contents brought to a temperature adequate to facilitate the formation of the N-substituted amino polysaccharide. Preferably, the temperature is from 10° C. to 100° C., more preferably from 40° C. to 60° C. The metal catalyst utilized may comprise any of the Group VIII metals, with nickel, palladium, platinum and ruthenium being preferred. Particularly preferred catalysts are Raney nickel catalyst and supported nickel catalysts such as those available from United Catalysts Inc., Louiville, Ky., under the trade name G-49B. The reactor is purged with nitrogen or a comparable inert gas and pressurized with hydrogen. The pressure will be effective to facilitate the reaction between the polysaccharide and the amine. Generally, the higher the pressure, the quicker is the reaction. Preferably the pressure will be at least about 100 psi, more preferably at least about 700 psi. The contents of the reactor are mixed until the reaction is substantially completed. Typically, the contents are mixed for about 8 to 20 hours, preferably about 12 hours. The temperatures and pressures noted above are not intended to limit the scope of the claims appended hereto. As one skilled in the art will recognize, once armed with the present specification, the conditions of temperature and pressure may be selected such that the reaction rate and product yield may be optimized.

After the N-substituted amino polysaccharide has been formed, the catalyst must be removed therefrom. While one skilled in the art will appreciate that there are various means to remove the catalyst, in preferred embodiments, the catalyst is removed via filtration. The N-substituted amino polysaccharide may be further concentrated to a solid, if so desired, and redissolved in water prior to forming the polysaccharide polymers of the present invention.

Preferably, after the catalyst is removed, a reagent which is terminated with one of an amine-reactive functionality selected from the group consisting of monocarboxylic acid chloride, isocyanate, chloroformate, mixed or symmetric anhydride of carboxylic acid, epoxide, primary alkyl halide, primary alkyl sulfonate, primary alkyl sulfate, methylene beta-lactone (substituted ketene dimer) and alkenyl succinic anhydride, is added to the N-substituted polysaccharide and the two are mixed under conditions effective to produce a polysaccharide polymer of structure (III) herein above. The residue of such reagents are represented by the formula -L-$R^4$-$R^5$-$R^6$, where L, $R^4$, $R^5$ and $R^6$ are as defined in structure (III) hereof. Exemplary amine reactive functionalities according to the present invention include, but are not limited to, those compounds, the residue of which are represented by the structures below:

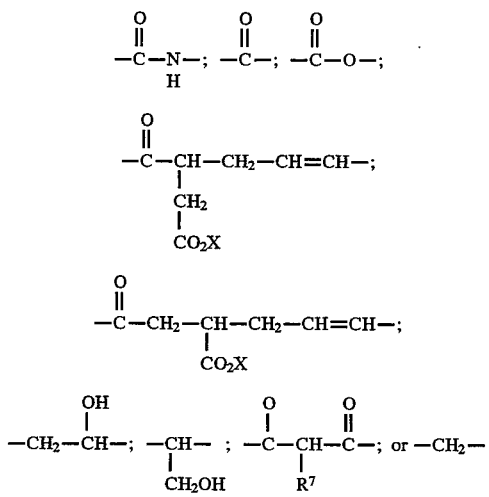

wherein X is selected from the group consisting of hydrogen, alkali metals, alkaline earth metals, ammonium and amine bases, and $R^7$ is H or a $C_1$-$C_{18}$ alkyl group. While the reagent may be terminated with any of the amine-reactive functionalities noted above, more preferably, the reagent will be terminated with one of an amine-reactive functionality selected from the group consisting of isocyanate, epoxide, methylene betalactone (substituted ketene dimer) and alkenyl succinic anhydride.

In preferred embodiments, a stoichiometric excess of the amine is mixed with the polysaccharide to facilitate the reaction of the polysaccharide with the amine. Without intending to be limited by the following, as the N-substituted amino polysaccharide is formed, a less preferred reaction between the N-substituted amino polysaccharide and the polysaccharide is believed to take place. A stoichiometric excess of the amine is used to facilitate the preferential reaction between the polysaccharide and the amine. It is preferred that the excess amount of amine used in the process be minimized, as any excess amine must be removed subsequent to the formation of the N-substituted amino polysaccharide. In addition, the amine is not used in excess amounts to the extent that it will function as a solvent in the process. Preferably, the polysaccharide and amine are used at molar ratios of 1:1 to 1:2, preferably from 1:1 to 1:1.5.

In a preferred embodiment, a corn syrup solid (DE=24, 0.3 mole) is dissolved in water and slow-added to 40% aqueous methyl amine (0.444 mole) and mixed. The mixture is added to a reactor along with a supported nickel catalyst. The reactor is purged with nitrogen and pressurized with hydrogen to 700 psi.. The contents are mixed to form N-methyl amino corn syrup solid. The catalyst is removed via filtration and dodecyl isocyanate is added to the contents of the reactor. The contents are mixed until the dispersion product is free of isocyanate by FT-IR. The dispersion is treated with an ion exchange resin, such as Amberlite® IR-120 (plus), available from Aldrich Chemical Company, Milwaukee, Wis., to remove unreacted starting amine. The resulting product may be freeze dried to a white powder upon completion of the reaction.

The polysaccharide polymers prepared by the process of the present invention have been found to be useful in concentrated, liquid detergent compositions as a deflocculating polymer. The polysaccharide polymers, when used in liquid detergent compositions set forth herein, will be referred to as polysaccharide deflocculating polymers (PDPs).

Typical liquid detergent formulations which may be improved by the addition of the PDP's of this invention are disclosed in U.S. Pat. Nos. 5,147,576, issued Sep. 15, 1992, to Montague, et al.; U.S. Pat. No. 5, 132,053, issued Jul. 21, 1992 to Crossin; 5, 110,506, issued May 5, 1992 to Ciallella; U.S. Pat. No. 4,923,635, issued May 8, 1990 to Simion, et al.; U.S. Pat. No. 4,873,012, issued Oct. 10, 1989, to Broze, et al.,; U.S. Pat. No. 4,663,071. isued May 5, 1987 to Bush, et al.; and U.S. Pat. No. 4,906,397, issued Mar. 6, 1990 to Leighton, et al.; which are hereby incorporated by reference.

In a preferred embodiment, the PDP is incorporated into a liquid household laundry detergent formulation, comprising, by weight, 5–50% surfactant(s), 2–55% builder (s), and 15–95% of a combination optional ingredients, such as buffers, enzymes, softeners, antistatic agents, fluorescers, dyes, perfumes, water and fillers. The PDP is used at 0.01 to 5.0%, preferably 0.01 to 2.0%, more preferably from 0.1 to 1%, by weight, of the detergent formulation. Also included herein are any detergent formulations, used commercially or experimentally, which employ electrolytes in an aqueous continuous phase, including a phosphate co-builder or phosphate-replacer builder or co-builder (e.g., citrate or zeolite) or any builder which functions chiefly to sequester calcium, magnesium, barium and other polyvalent cations present in hard water. Formulations employing mixtures of builders, including phosphate-containing mixtures, are also useful.

Optional components of the detergent formulations Include, but are not limited to, ion exchangers, alkalies, anticorrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers.

These optional components may comprise up to about 90%, by weight, of the detergent formulation, preferably 0 to 50%, most preferably 1 to 25%, of the detergent formulation.

The detergent compositions of this invention may take any of the physical forms associated with detergent compositions. They may be produced by any of the techniques commonly employed in the manufacture of detergent compositions. The PDP may be incorporated into the liquid composition at any stage of processing, but, when used for viscosity reduction and for liquid phase stability, is preferably added after the detergent active component(s) has been added to the electrolyte-containing aqueous phase. The practitioner will recognize which formulations are best suited to the physical form selected for a particular detergent composition and adjust the formulation accordingly.

Preferably, the viscosity of the aqueous continuous phase is less than 25 mPas, most preferably less than 15 mPas, especially less than 10 mPas, these viscosities being measured using a capillary viscometer, for example an Ostwald viscometer.

Sometimes, it is preferred for the compositions of the present invention to have solid-suspending properties (i.e. capable of suspending solid particles). Therefore, in many preferred examples, suspended solids are present. However, sometimes it may also be preferred that the compositions of the present invention do not have solid suspending properties.

In liquid detergent formulations, the term "deflocculating" polymer means that the equivalent liquid detergent composition, minus the polymer, has a significantly higher viscosity and/or becomes unstable. It is not intended to embrace polymers which would increase the viscosity and not enhance the stability of the composition. It is also not intended to embrace polymers which would lower the viscosity simply by a dilution effect, i.e. only by adding to the volume of the continuous phase. Nor does it include those polymers which lower viscosity only by reducing the volume fraction (shrinking) of the lamellar droplets, as disclosed in European patent application EP 301 883.

Thus, within the ambit of the present invention, relatively high levels of the PDP can be used in those systems where a viscosity reduction is brought about; and, typically, levels as low as from about 0.01% by weight to about 1.0% by weight can be capable of reducing the viscosity at 21 $s^{-1}$ by up to 2 orders of magnitude.

Without being bound by any particular interpretation or theory, Applicant has hypothesized that the polymers exert their action on the composition by the following mechanism. The hydrophobic terminal groups (or caps) could be incorporated only in the outer bi-layer of the droplets, having the hydrophilic backbone over the outside of the droplets and additionally the polymers could also be incorporated deeper inside the droplet.

When the hydrophobic terminal caps are only incorporated in the outer bilayer of the droplets, this has the effect of decoupling the inter- and intra-droplet forces, i.e., the difference between the forces between individual surfactant molecules in adjacent layers within a particular droplet and those between surfactant molecules in adjacent droplets could become accentuated in that the forces between adjacent droplets are reduced. This will generally result in an increased stability due to less flocculation and a decrease in viscosity due to smaller forces between the droplets resulting in greater distances between adjacent droplets.

When the polymers are incorporated deeper inside the droplets also less flocculation will occur, resulting in an increase in stability. The influence of these polymers within the droplets on the viscosity is governed by two opposite effects: (1) the presence of deflocculating polymers will decrease the forces between adjacent droplets, resulting in greater distances between the droplets, generally resulting in a lower viscosity of the system; and (2) the forces between the layers within the droplets are equally reduced by the presence of the polymers in the droplet, this generally results in an increase in the water layer thickness, therewith increasing the lamellar volume of the droplets, and increasing the viscosity. The net effect of these two opposite effects may result in either a decrease or an increase in the viscosity of the product.

When a reduction in viscosity is required for processing or consumer handling of the detergent, the PDP is used in a detergent composition at an amount effective for yielding at least a 50% reduction in viscosity of the detergent composition which does not contain the PDP. These effects are observed typically in concentrated liquid detergents at a polymer usage level of 0.01 to 2.0% by weight, preferably 0.05 to 1.0%.

When thickening is desired to maintain suspended particles, to act as a co-builder, or to stabilize the liquid phases of conventional liquid detergents, the PDP is used in an amount effective to suspend and/or stabilize incompatible or unstable materials. These effects are observed typically at a PDP usage level of about 1 to 10%, preferably 2 to 5%, by weight, depending upon the type of detergent composition.

For liquid phase stability in either a deflocculating or thickening mode, a "stable" liquid detergent composition is a composition which yields no more than 2%, by volume, visually-observed phase separation following storage at 25° C. for 21 days.

The following examples are in no way meant to limit the breadth of the claims appended hereto but are submitted merely to present preferred embodiments of the present invention.

EXAMPLE

INVENTIVE POLYMERS

Isocyanate-terminated reagent:

200 g of a corn syrup solid (DE=24, 0.3 mole, average of n=3) was dissolved in 200 g of deionized water. The solution was slow added over 30 minutes to 34.5 g of 40% aqueous methyl amine (0.444 mole) which had been cooled to less than 10° C. with an ice bath. The solution was then mixed for 60 minutes at room temperature. The resulting mixture was placed in a one liter Parr reactor with 20 g of the G-49B nickel catalyst. The reactor was warmed to 50° C. with a water bath. The Parr reactor was purged with nitrogen and pressurized with hydrogen to 700 psi. The contents of the reactor were mixed for 12 hours while maintaining the hydrogen pressure at about 700 psi. The resulting solution was filtered to remove the catalyst and the solution was concentrated to a glassy solid product of N-methyl amino corn syrup solid. The number average molecular weight ($M_n$) was found to be 749g/mole by titration with 0.1N HCl. 29 g of the N-methyl amino corn syrup solid ($M_n$=749 g/mole, 0.028 mole) was dissolved in 61.7 g of deionized water. To the solution was added 5.95 g of dodecyl isocyanate (0.028 mole). The resulting suspension was mixed for 16 hours, after which time the resulting translucent dispersion was free of isocyanate by FT-IR analysis. The dispersion was diluted to 15% solids with deionized water in order to reduce viscosity. The dispersion was titrated with 0.1N HCl to determine the presence of excess starting amine. The dispersion was contacted with Amberlite® IR-120 (plus) ion exchange resin to remove unreacted starting amine. The resulting slurry of the dispersion and the ion exchange resin was filtered to remove the ion exchange resin and the resultant product freeze dried to a white powder. The product yield was approximately 77% of theoretical. The polysaccharide polymer so prepared was designated Polymer 1A.

N-methyl amino maltodextrins of $M_n$=2,120 and 3363, respectively, were prepared as above. The N-methyl amino maltodextrins so prepared were reacted with dodecyl isocyanate as above. The polysaccharide polymers so prepared were designated Polymer 1 B and Polymer 1C, respectively. The product yield for both polymers was greater than 75% of theoretical.

Epoxide-terminated reagent;

20 g of N-methyl amino maltodextrin ($M_n$=2120, 0.0094 mole) is dissolved in 80 g deionized water. To the resulting solution is added 2.0 g of 1,2-epoxtetradecane (0.0094 mole). The resulting mixture is stirred at 50° C. for 16 hours, at which time a translucent dispersion is obtained. The resulting solution is freeze dried to a white powder.

Alkenyl succinic anhydride-terminated reagent:

20 g of N-methyl amino maltodextrin ($M_n$=2120, 0.0094 mole) is dissolved in 80 g deionized water. The pH of the resulting solution is monitored continously during the course of reaction with a pH electrode. To this solution is added 2.0 g 2-octen-1-ylsuccinic anhydride (0.0095 mole). The reaction mixture is stirred at ambient temperature. The pH of the reaction mixture is maintained between 7 and 9 by the drop-wise addition of 1.0N sodium hydroxide. The reaction is complete when the pH is stable and a homogenous solution is obtained. The resulting solution is freeze dried to obtain a white powder.

EXAMPLE 2

COMPARATIVE POLYMERS:

Hydropohobically-terminated polymers:

A comparative polymer wherein the average of n=0 was prepared according to the following procedure:

16.5 g (0.085 mole) of N-methylglucamine, 100 g pyridine, and 10 ml of water were mixed into solution. To this solution was slow added 17.9 g (0.085 mole) of dodecyl isocyanate over a one hour period. The resulting solution was gravity filtered into an addition funnel to remove insoluble material and slowly added to cold (about −40° C.) acetone. The resulting precipitate was filtered and dried to a constant mass. A yield of 25.6 g (74.6% of theoretical) of a white powder was obtained. The product was titrated for residual base and found to contain 0.19 meq/g of residual base. The product was recrystalized from water to yield 22.4 g (65.3% of theoretical) of an amine-free powder. The polymer was designated Polymer 2a.

A comparative polymer wherein the average of n=1 was prepared according to the following procedure:

50 g of N-methyl maltamine (0.13 mole) was dissolved in 67.5 g of deionized water. To this solution was added 27.4 g of dodecyl isocyanate (0.13 mole). The resulting suspension was mixed for 16 hours and at the end of the 16 hours of mixing the resulting thick, milky dispersion was free of isocyanate by FT-IR analysis. This dispersion was diluted to about 15% solids with 400 g of deionized water to reduce viscosity. The dispersion was warmed to 50° C. to facilitate filtration and was then vacuum filtered. The filtrate was then titrated with 0.1N HCl for starting amine. The filtrate was treated with Amberlite® IR-120 (plus) ion exchange resin to remove unreacted starting amine. The resulting solution was died to a white powder yielding 1.26 g (1.6% of theoretical). The polymer was designated as Polymer 2b.

A comparative polymer was prepared as in Example 1a above, except that maltotriose (average n=2) was used in place of maltodextrin (average n=3). The comparative polymer was designated Polymer 2c. The product yield for Polymer 2c was about 53% of theoretical.

Randomly-modified polymers:

Comparative polymers wherein the decoupling polymer was randomly modified with a hydrophobic moiety, as opposed to being terminated with a hydrophobic moiety, were prepared according to the following procedures:

25 g of Frodex™ 24 (DE=24, 0.03 mole) were added to 500 ml of pyridine and 30 ml of toluene. The solution was then warmed to reflux and 50 ml of solvent was removed in order to azeotropically remove the water in the system. The solution was allowed to cool and 6.2 g (0.03 mole) of dodecyl isocyanate were added and mixed for 16 hours. After mixing for 16 hours the solution was free of isocyanate by FT-IR analysis. The solution was concentrated under reduced pressure to a white powder yielding 23.5 g (75.4% of theoretical). The polymer was designated Polymer 2d.

20 g of Lodex™ 10 (DE=10, 0.01 mole) were dissolved in 400 g of dimethyl formamide (DMF) and 30 g of toluene. The solution was then warmed to reflux and 60 ml of solvent was removed in order to azeotropically remove the water in the system. The solution was allowed to cool to 60° C. and to this solution were added 2.2 g (0.011 mole) of dodecyl isocyanate and 0.2 g of dibutyl tin dilaurate. FT-IR analysis showed the solution to free of isocyanate after one hour of mixing. The solution was concentrated under reduced pressure to a white powder yielding 21.8 g (98.4% of theoretical). $^1$H-NMR analysis indicated the presence of about 15 mole % of DMF, therefor the solids were dissolved in 180 g of deionized water and freeze dried to remove residual DMF. Yield of freeze dried solid free of DMF by $^1$H-NMR was 18.6 g (83.8% of theoretical). The polymer was designated Polymer 2e.

EXAMPLE 3

TEST DETERGENT FORMULATION

Each of the inventive polymers and comparative polymers prepared were incorporated into the following detergent formulation according to the following procedure. All parts are by weight, based on the total weight of the detergent composition.

| Ingredient | parts by weight |
| --- | --- |
| 1. water | *(1) |
| 2. decoupling polymer (neat) | See Table 1 |
| 3. glyderol | 5.0 |
| 4. sodium borate | 3.5 |
| 5. sodium citrate | 10.0 |
| 6. 50% sodium hydroxide (aqueous) | 6.6 |
| 7. Bio-Soft ™ S-100 (anionic surfactant, Stepan Co.) | 26.2 |
| 8. Neodol ™ 25-9 (non-ionic surfactant, Shell Chemical Co.) | 12.0 |
| | 100 |

*(1) = balance of water to a total of 100 parts by weight

Ingredients 1–6 were mixed together to form a solution. To the solution was added ingredients 7 and 8 with mixing. The resulting detergent compositions were poured into a graduated cylinder and monitored to determine the % phase separation as measured over time. The % phase separation was noted at intervals of 1 day, 3 days, 7 days and 21 days. Phase separation is noted as the point where two distinct phases are visually observed; the bottom (aqueous) phase and the top surfactant phase. The % phase separation is noted as the volume % of the aqueous phase, based on the total volume of the detergent composition.

The results of the phase separation evaluation are set forth in Table 1.

TABLE 1

| | Detergent Composition Phase Separation | | | | |
|---|---|---|---|---|---|
| | | % Phase Separation (Volume) | | | |
| Polymer | % Polymer (weight) | Day 1 | Day 3 | Day 7 | Day 21 |
| 1a | 0.9 | 0 | 0 | 0 | 0 |
| 1b | 0.9 | 0 | 0 | 0 | 0 |
| 1c | 2.0 | 0 | 0 | 0 | |
| 2a | 0.9 | 12 | 14 | 18 | |
| 2b | 0.9 | 4 | 10 | 14 | |
| 2c | 0.9 | 13 | 16 | 20 | |
| 2d | 0.9 | 0 | 6 | 7 | 7 |
| 2e | 0.9 | 0 | 9 | 13 | 13 |
| C[(1)] | 0.9 | 0 | 0 | 0 | |
| Blank[(2)] | 0.0 | 12 | 16 | 20 | |

[(1)]Commercial acrylic deflocculating polymer.
[(2)]Detergent composition minus any deflocculating polymer.

Degree of polymerization:

As the results indicate, in the comparative polymers where the average of n is less than three, the polymer does not exhibit deflocculating properties, as evidenced by the % phase separation. Furthermore, the inventive polymers exhibit deflocculating properties which are comparable to commercial acrylic deflocculating polymers of the type disclosed in U.S. Pat. No. 4,906,397 (Leighton et al.).

Random modification vs. terminal modification

As the results indicate, while the randomly modified comparative polymers wherein the average of n is greater than 2 exhibit some deflocculating properties, the terminally modified polymers of the present invention exhibited deflocculating properties far superior to the non-terminated comparative polymers.

Although emphasis has been placed on laundry detergent compositions in these examples, detergent compositions for all cleaning purposes are included within the scope of this invention. Various modifications and improvements on the compositions herein will become readily apparent to those skilled in the art. Accordingly, the scope and spirit of the invention are to be limited only by the claims and not by the foregoing specification.

We claim:

1. A process for preparing polysaccharide polymers, the process comprising:

(a) mixing together, in water and in the absence of a cosolvent, (i) a polysaccharide represented by structure (I);

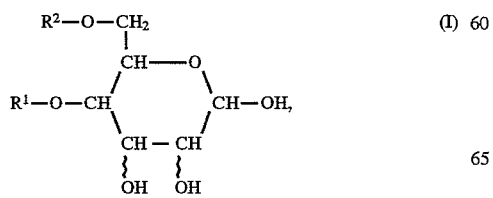

wherein, $R^1$ is H or is represented by structure I(a)

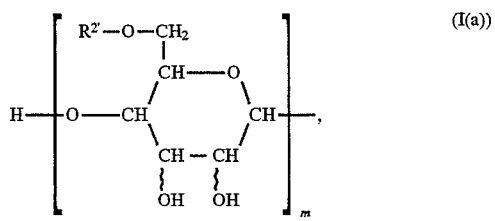

$R^2$ is H, or is represented by structure I(a) or structure I(b)

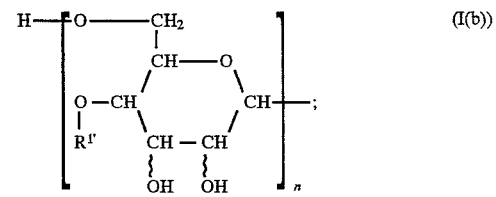

wherein
$R^{1'}$ is H or is represented by structure I(a),
$R^{2'}$ is H or is represented by structure I(a) or structure I(b),
$R^1$ and $R^2$ are not both H, and
the average of ($\Sigma m + \Sigma n$) is greater than or equal to 3; and (ii) an amine selected from the group consisting of $R^3NH_2$, where $R^3$ is selected from the group consisting of a $C_1-C_3$ alkyl group, H or $NH_2$, thereby producing an aqueous admixture of the polysaccharide and the amine.

(b) contacting the aqueous admixture of the polysaccharide and the amine with hydrogen, under pressure, in the presence of a Group VIIIB metal catalyst and under conditions effective to produce an N-substituted amino polysaccharide of structure (II);

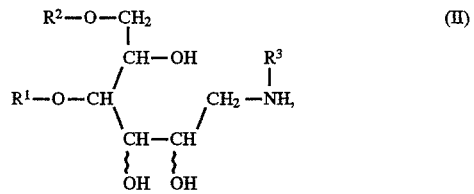

(c) adding to the N-substituted amino polysaccharide a reagent which is terminated with one of an amine-reactive functionality selected from the group consisting of a monocarboxylic acid chloride, isocyanate, chloroformate, mixed or symmetric anhydrides of carboxylic acids, epoxide, primary alkyl halide, primary alkyl sulfonate, primary alkyl sulfate, methylene beta-lactone and alkenyl succinic anhydride; and (d) mixing the N-substituted amino polysaccharide and the reagent under conditions effective to produce a polysaccharide polymer of structure (III),

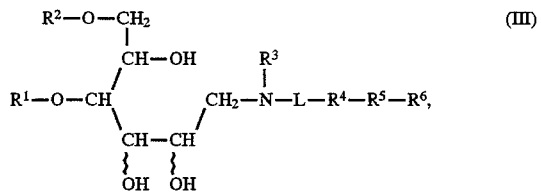

wherein $R^1$, $R^2$, $R^3$, $R^{1'}$ and $R^{2'}$ are as above, $R^4$ represents from 1 to 50 independently selected alkyleneoxy groups or is absent, $R^5$ is a phenylene linkage or is absent, $R^6$ is H, or a $C_1$–$C_{24}$ alkyl group, or the residue of a $C_8$–$C_{20}$ alkenyl succinic anhydride, provided that; when $R^5$ is absent and $R^6$ represents H or contains not more than 4 carbon atoms, then $R^4$ must contain an alkyleneoxy group with at least 3 carbon atoms; when $R^4$ is absent, $R^6$ is not H; and when $R^4$ and $R^5$ are absent, then $R^6$ must contain at least 5 carbon atoms, L is the residue of the amine-reactive functionality, and the average of ($\Sigma m + \Sigma n$) is greater than or equal to 3;

wherein excess amine and the catalyst are removed from the reaction.

2. The process according to claim 1 wherein the amine-reactive functionality is selected from the group consisting of isocyanate, epoxide, methylene beta-lactone and alkenyl succinic anhydride.

3. The process according to claim 2 wherein the aqueous admixture of the polysaccharide and the amine are contacted with the hydrogen at a pressure of at least 100 psi and the Group VIIIB catalyst is selected from the group consisting of nickel, platinum, palladium and ruthenium.

4. The process according to claim 3 wherein $R^3$ is a $C_1$–$C_3$ alkyl group, the Group VIIB catalyst is nickel and the amine-reactive functionality is isocyanate.

5. The process according to claim 4 wherein $R^3$ is a methyl group and the reagent is dodecyl isocyanate.

6. The process according to claim 1 wherein $R^1$ is represented by structure I(a), $R^2$ is H or is represented by structure I(a) and $R^{2'}$ is H or represented by structure I(a).

7. The process according to claim 6 wherein the amine-reactive functionality is selected from the group consisting of isocyanate, epoxide, methylene beta-lactone and alkenyl succinic anhydride.

8. The process according to claim 7 wherein $R^3$ is a $C_1$–$C_3$ alkyl group.

9. The process according to claim 8 wherein $R^3$ is a methyl group and the reagent is dodecyl isocyanate.

10. The process according to claim 1 wherein the aqueous admixture of the polysaccharide and the amine are contacted with the hydrogen at a pressure of at least 100 psi and the Group VIIIB catalyst is selected from the group consisting of nickel, platinum, palladium and ruthenium.

11. A polysaccharide polymer comprising structure (III)

$$R^2-O-CH_2 \atop \phantom{R^2-O-}|\phantom{CH_2} \quad \text{(III)}$$

```
      R²—O—CH₂
           |
          CH—OH      R³
         /            |
    R¹—O—CH          CH₂—N—L—R⁴—R⁵—R⁶,
         \          /
          CH — CH
          |    |
          OH   OH
``` wherein, $R^1$ is H or is represented by structure I(a)

```
      ⎡ R²'—O—CH₂                  ⎤        (I(a))
      ⎢       |                    ⎥
      ⎢      CH——O                 ⎥
      ⎢     /    \                 ⎥
  H—⎢—O——CH      CH—⎥—,
      ⎢     \    /                 ⎥
      ⎢     CH—CH                  ⎥
      ⎢     |   |                  ⎥
      ⎣     OH  OH                 ⎦ₘ
```

$R^2$ is H, or is represented by structure I(a) or structure I(b)

```
  H—⎡—O———CH₂                  ⎤      (I(b))
      ⎢       |                 ⎥
      ⎢      CH——O              ⎥
      ⎢     /    \              ⎥
      ⎢ O—CH      CH—⎥—,
      ⎢ |    \    /             ⎥
      ⎢ R¹'   CH—CH             ⎥
      ⎢       |   |             ⎥
      ⎣       OH  OH            ⎦ₙ
```

$R^{1'}$ is H or is represented by structure I(a), $R^{2'}$ is H or is represented by structure I(a) or structure I(b), $R^1$ and $R^2$ are not both H, $R^3$ is selected from the group consisting of a $C_1$–$C_3$ alkyl group, H or $NH_2$, $R^4$ represents from 1 to 50 independently selected alkyleneoxy groups or is absent, $R^5$ is a phenylene linkage or is absent, $R^6$ is H, or a $C_1$–$C_{24}$ alkyl group, or the residue of a $C_8$–$C_{20}$ alkenyl succinic anhydride, provided that; when $R^5$ is absent and $R^6$ represents H or contains not more than 4 carbon atoms, then $R^4$ must contain an alkyleneoxy group with at least 3 carbon atoms; and when $R^4$ is absent, then $R^6$ is not H; and when $R^4$ and $R^5$ are absent, then $R^6$ must contain at least 5 carbon atoms, L is the residue of one of an amine-reactive functionality selected from the group consisting of a monocarboxylic acid chloride, isocyanate, chloroformate, mixed or symmetric anhydrides of carboxylic acids, epoxide, primary alkyl halide, primary alkyl sulfonate, primary alkyl sulfate, methylene beta-lactone and alkenyl succinic anhydride; and the average of ($\Sigma m + \Sigma n$) is greater than or equal to 3.

12. The polysaccharide polymer according to claim 11 wherein the amine-reactive functionality is selected from the group consisting of a isocyanate, epoxide, methylene beta-lactone and alkenyl succinic anhydride.

13. The polysaccharide polymer according to claim 11 wherein $R^1$ is represented by structure I(a), $R^2$ is H or is represented by structure I(a) and $R^{2'}$ is H or represented by structure I(a).

14. The polysaccharide polymer according to claim 13 wherein the amine-reactive functionality is selected from the group consisting of isocyanate, epoxide, methylene beta-lactone and alkenyl succinic anhydride.

15. The polysaccharide polymer according to claim 14 wherein $R^3$ is a $C_1$–$C_3$ alkyl group.

16. The polysaccharide polymer according to claim 15 wherein $R^3$ is a methyl group.

* * * * *